United States Patent [19]

Breternitz, Jr.

[11] Patent Number: 5,537,620

[45] Date of Patent: Jul. 16, 1996

[54] REDUNDANT LOAD ELIMINATION ON OPTIMIZING COMPILERS

[75] Inventor: Mauricio Breternitz, Jr., Austin, Tex.

[73] Assignee: International Business Machines Corporation, Armonk, N.Y.

[21] Appl. No.: 307,216

[22] Filed: Sep. 16, 1994

[51] Int. Cl.$^6$ ..................................................... G06F 9/45
[52] U.S. Cl. ........................ 395/700; 364/DIG. 1; 364/280.4; 364/280.5
[58] Field of Search .............................................. 395/700

[56] References Cited

U.S. PATENT DOCUMENTS

| | | |
|---|---|---|
| 4,435,753 | 3/1984 | Rizzi . |
| 4,567,574 | 1/1986 | Saade et al. . |
| 4,656,582 | 4/1987 | Chaitin et al. . |
| 4,656,583 | 4/1987 | Auslander et al. . |
| 4,920,477 | 4/1990 | Colwell et al. ........................ 364/200 |
| 4,931,928 | 6/1990 | Greenfeld . |
| 4,953,084 | 8/1990 | Meloy et al. . |
| 5,107,418 | 4/1992 | Cramer et al. ........................ 395/700 |
| 5,287,510 | 2/1994 | Hall et al. ............................. 395/700 |
| 5,293,631 | 3/1994 | Rau et al. ............................. 395/700 |
| 5,333,280 | 7/1994 | Ishikawa et al. ..................... 395/375 |
| 5,442,797 | 8/1995 | Casavant et al. ..................... 395/800 |

FOREIGN PATENT DOCUMENTS

| | | |
|---|---|---|
| 0190622A2 | 1/1986 | European Pat. Off. . |
| 0476667A2 | 9/1991 | European Pat. Off. . |

OTHER PUBLICATIONS

Hisley, Philip N., "Highly polished C code", PC Tech Journal, Jun. 1988, v6 n6 p. 76(15).

Shaw, Richard Hale, "Writing optimal C: part 2", PC Magazine, Sep. 13, 1988 v7 n15 p. 285(10).

Shaw, Richard Hale, "Analyzing the optimization techniques compilers use to transform your C code", Microsoft Systems Journal, Microsoft Systems Journal, Mar. 1991 v6 n2, p. 29(8).

Bogong Su; Jian Wang, "GUPR*: a new global software pipelining algorithm", Conference title: Proceedings of the 24th International Symposium on Microarchitecture. MICRO 24, pp. 212-216, Published by ACM, New York, 1991.

Lane, Alex, "Optimizations in C", Computer Language, May 1993, v110 n5 p. 53(6).

Prince, Tim, "Performance tuning a complex FFT", C Users Journal, May 1993, v11 n5 p. 61(5).

Kildall, Gary A., *A Unified Approach To Global Program Optimization*, Computer Science Group, Naval Postgraduate School, ACM V–IV+242, 1973, pp. 194–206.

Bendelac et al. "CTP—A family of optimizing compilers for the NS32532 microprocessor", IEEE Computer Society Press 1988 pp. 247–250.

*Primary Examiner*—Kevin A. Kriess
*Assistant Examiner*—St. John Courtenay, III
*Attorney, Agent, or Firm*—Craig J. Yudell; Andrew J. Dillon

[57] ABSTRACT

A method for eliminating redundant loads in an optimizing compiler is provided. When a LOAD and memory operation occur in an iterative loop structure having an induction variable, the method determines if redundant load elimination optimization may be performed by performing the steps of: creating a symbolic address for a LOAD operation, where the LOAD operation follows a memory operation, creating a symbolic address for the memory operation which precedes the LOAD, and subtracting the LOAD symbolic address from the memory operation symbolic address to generate a difference. If the difference is a constant which is divisible by the increment of the induction variable, the method eliminates the LOAD instruction for each increment of the loop and includes an instruction to copy the value of the memory operation to a register, and further includes an instruction to move the copied value from the register to the target of the load. An additional feature of the invention includes the step of, if the difference is a constant which is divisible by a multiple of the increment of the induction variable, wherein the multiple is greater than one, including additional instructions to copy the value of the memory operation to a separate register for each iteration during a number of iterations equal to the multiple.

24 Claims, 1 Drawing Sheet

REDUNDANT LOAD ELIMINATION ON OPTIMIZING COMPILERS

BACKGROUND OF THE INVENTION

1. Technical Field

This invention relates in general to optimizing compilers, and in particular to redundant load elimination optimization on optimizing compilers.

2. Description of the Related Art

Optimizing compilers optimize the executable code of a computer program by rearranging the code sequences to take maximum advantage of the computer architecture and the specific configuration of the individual computer program. Of particular importance in optimizing compilers is the elimination of redundant loads. Redundant loads are loads from memory into a CPU register which have taken place previously in the compiled program. Redundant load elimination in optimizing compilers recognizes and enhances the situation in which the result of a memory load instruction is already available in a CPU register, and thus, an additional load instruction for that value is not necessary. Such redundant load elimination reduces memory traffic requirements to yield more efficient code.

Redundant load elimination is even more important for modern compilers which implement loop reordering for enhanced cache behavior and advanced optimization such as Pipeline Scheduling (PS). Pipeline Scheduling schedules the execution of loop iterations in overlapping fashion so that they may be pipelined through the processor. For loops with recurrences, the memory accesses in a subsequent iteration (i+1) are frequently made to the same locations accessed by a previous iteration (i).

Redundant Load Elimination recognizes when the target of a Load Instruction is the same as a previous Store or Load Instruction. By saving the previous argument in a register, the LOAD is eliminated from the compiled program, creating more efficient code. Furthermore, many modern compilers use preprocessors to enhance cache locality by producing stride-1 array accesses. The application of Pipeline Scheduling to these loops is likely to introduce further opportunities for Redundant Load Elimination.

In traditional vectorizing/parallelizing compilers, Load/Store elimination is usually implemented via pattern recognition. This type of optimization is complex and burdensome, and significantly adds to compiler processing. It would be desirable to have a Redundant Load Elimination optimization which is simple to implement, and further, takes advantage of processing already performed by modern compilers so that the addition of the Redundant Load Elimination optimization is a simple extension of modern optimizing compilers.

SUMMARY OF THE INVENTION

According to the present invention, a method for eliminating redundant loads in an optimizing compiler is provided. When a LOAD and memory operation occur in an iterative loop structure having an induction variable, the method determines if redundant load elimination optimization may be performed by performing the steps of: creating a symbolic address for a LOAD operation, where the LOAD operation follows a memory operation, creating a symbolic address for the memory operation which precedes the LOAD, and subtracting the LOAD symbolic address from the memory operation symbolic address to generate a difference. If the difference is a constant which is divisible by the increment of the induction variable, the method eliminates the LOAD instruction for each increment of the loop and includes an instruction to copy the value of the memory operation to a register, and further includes an instruction to move the copied value from the register to the target of the load.

An additional feature of the invention may include the step of, if the difference is a constant which is divisible by a multiple of the increment of the induction variable, wherein the multiple is greater than one, including additional instructions to copy the value of the memory operation to a separate register for each iteration during a number of iterations equal to the multiple.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

DETAILED DESCRIPTION OF THE PREFERRED EMBODIMENT

Figure 1:
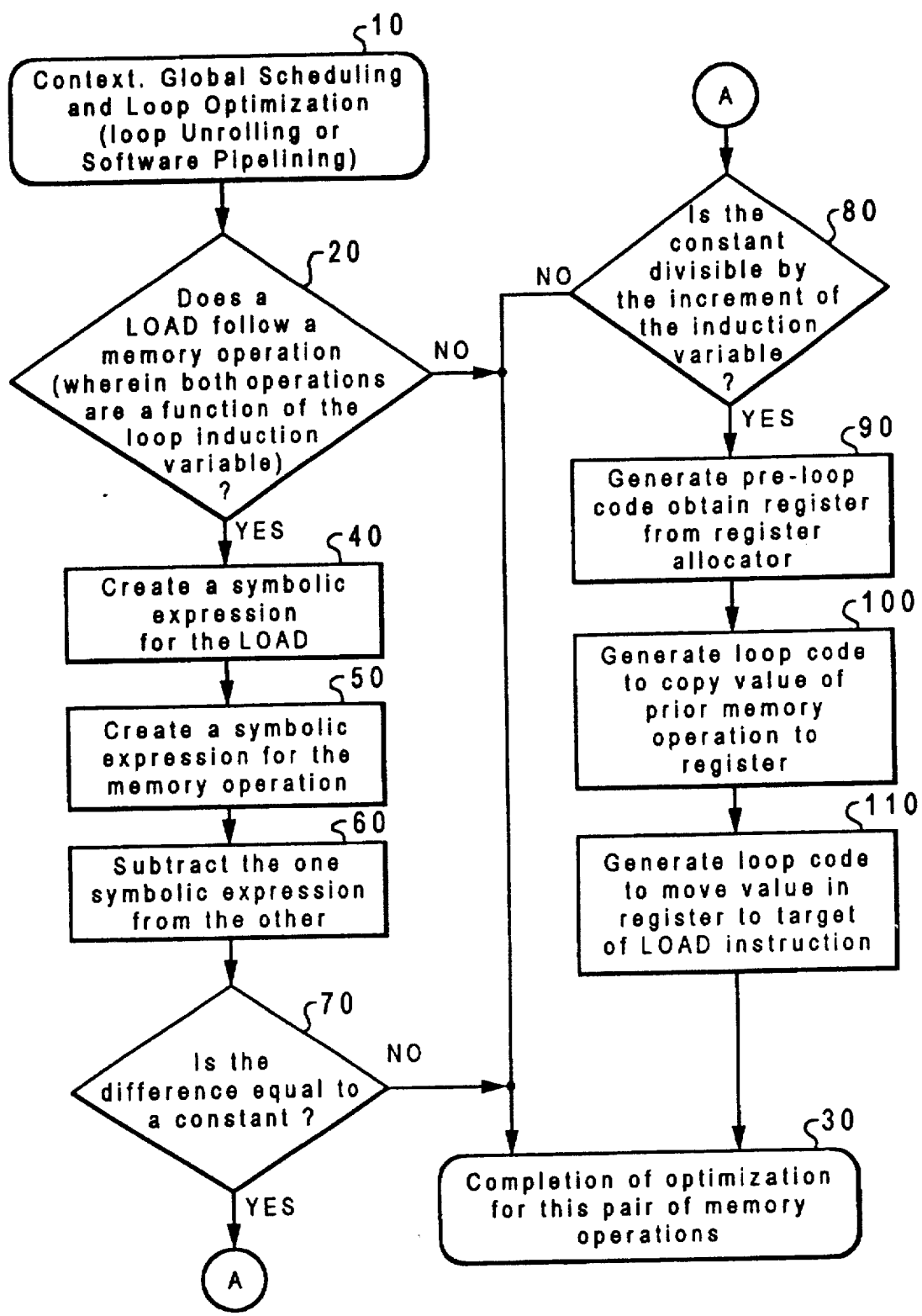
FIG. 1 depicts a flow diagram of a method of redundant load elimination in an optimizing compiler in accordance with a preferred embodiment of the present invention.

The preferred embodiment of the present invention implements Redundant Load Elimination optimization by incorporating it into the data dependency phase of global scheduling (in compilers which provide such a capability). The data dependency phase allows independent memory operations to be scheduled concurrently, while data dependency of memory operations requires that the memory operations be executed in instruction order.

Memory disambiguation is required to compute data dependency between memory operations. Indirect memory references due to the use of array indices and pointers pose problems to the computation of data dependencies. This is particularly a problem when the indices are used in program loops. For example, assume that a memory store operation is followed by a load operation. To determine whether the load operation can be scheduled either concurrently or before the store, it is necessary to check whether the memory locations accessed by the two memory references may be the same in some loop iteration. Many modern compilers for superscalar architectures implement a form of memory disambiguation to enhance code scheduling capabilities. An example of such a compiler is XLC produced by International Business Machines, New York. This compiler may be run on hardware such as the RS/6000 Workstation produced by International Business Machines.

However, most current compiler implementations do not distinguish between multiple accesses to the same array. This serializes the memory access by preserving the original order specified in the program, possibly causing performance degradation in a superscalar processor. Alternatively, memory-reference disambiguation in more aggressive compilers attempts to determine whether two memory references may access the same memory location. This is done by constructing symbolic expressions for the memory addresses, and then checking if the expressions may ever have the same value. For example, with array accesses A[i] and A[i+1], it is not difficult to determine that the memory locations involved are never the same. In case memory accesses do not conflict, the compiler may reorder the accesses to enhance concurrent execution of instructions.

The preferred embodiment of the present invention is preferably added to a global scheduler which includes a fine-grain memory disambiguation algorithm. The fine-grain memory disambiguation algorithm builds a symbolic expression that describes the addresses of memory accesses in a loop. The terms of the expression are a loop invariant and an imaginary loop induction variable which is incremented on each trip through the loop. These expressions are used in a multitude of compilers to determine data dependency between two memory accesses. Data dependency is detected by symbolic subtraction of the corresponding expressions of two separate memory accesses. If the difference between the two expressions is 0, the memory operations are accessing the same value in memory. There are many compilers which utilize such an algorithm, and such is easily accessible by one skilled in the art. An example of a product that uses such a fine-grain memory disambiguation algorithm is the "Multiflow" compiler produced by Multiflow Company of Connecticut.

The following is a short description of how disambiguation algorithms generate symbolic expressions. For a more detailed description of a method of computing symbolic expressions for memory addresses, see "Bulldog: A Compiler For VLIW Architectures", John R. Ellis, YALEU/DCS/RR-364, February, 1985, which is incorporated herein by reference.

The compiler builds a symbolic expression for the target of a memory access in terms of loop invariants, loop indices, and definitions of other variables as follows. Initially, the symbolic expression of every operation is initialized to the corresponding operation number (operation 1=OP1, operation 2=OP2, etc.). Each operation (OP) corresponds to a free variable that represents its result in a symbolic expression. For example, let us assume that operation OP1 writes variable "a" which is an argument of some other operation OP2, wherein operation OP2 is "m=a+1", and that the definition of "a" in OP1 is the only one that reaches OP2. By substituting the symbolic expressions of the operations that define inputs of OP2, the symbolic expression for the value of the result of operation OP2 is "OP1+1".

To complete the symbolic expression for "m", the algorithm is applied recursively to find the symbolic expression for the result of operation OP1. This is done by creating an expression in which the operator is the op-code of operation OP1, and substituting in that expression the symbolic expressions for the operations that define input arguments for operation OP1. The result of this process are usually linear expressions of the form $k_1*OP_1+k_2*OP_2+k_3*OP_4+ \ldots +k_n$, where the $OP_i$ are variables and the $k_i$ are integer constants.

An operation may be reached by more than one definition of an input argument. Here, the symbolic expressions contain the "OR" operator to express alternative values for that argument. For instance, in the above example, if there are two definitions of "a" reaching operation OP2, such as from operation OP1 and operation OP3, the symbolic expression for the result of operation OP2 will initially be (OP1+1) OR (OP3+1). Substitution of the symbolic expressions for operation 01 and OP3 completes the expression.

When creating a symbolic expression for operations within a loop, loop induction variables are detected prior to the creation of the symbolic expressions. An induction variable is a variable whose value is written in one iteration of the loop but used in a later iteration. The induction variable is then represented in the symbolic expression by a closed form expression in terms of an imaginary loop counter.

The disambiguation algorithm is interested only in the integer operations of addition, multiplication, and subtraction, and it stops recursing when it encounters any other operations. The reason for this is that the resulting expression would contain operators other than addition and multiplication, thus resulting in non-linear equations that cannot be handled by the mechanism which solves only diophantine equations. In such cases, the compiler takes the conservative approach and schedules the memory accesses serially. Similarly, the process of substitution must stop if the symbolic expression of an operation (OP) is required while deriving the symbolic expression for OP itself, otherwise infinite recursion follows. This happens if operation OP may use a value previously computed by itself, possibly in a previous loop iteration.

According to the present invention, an opportunity for redundant load elimination exists whenever the symbolic difference of the two memory operations as defined above is a constant. Thus, the present invention provides a simple and efficient method of recognizing when Redundant Load Elimination optimization can be used on an optimizing compiler.

If certain conditions are met, Redundant Load Elimination optimization can be performed on a pair of memory operations—the conditions being: 1) a second memory operation is a load operation which follows a first memory operation, either load or store, 2) both memory operations are from the same memory array, 3) both operations are a function of the loop induction variable, and 4) the difference between the two symbolic addresses is equal to a constant divisible by the increment of the induction variable. This information and data is obtained from other compiler processes, namely, the data dependency/memory disambiguation algorithm for enhanced global scheduling. By utilizing this information, the present invention enhances compiler performance by reducing run-time processor overhead and memory consumption.

A major advantage of the present invention is its simplicity and compatibility with existing optimizing compilers. As has been explained, sophisticated optimizing compilers include global schedulers that have fine-grain memory disambiguation algorithms which determine data dependency by calculating the symbolic difference between pairs of memory accesses. The present invention expands upon this computation, as explained below, to recognize the case in which the difference between the symbolic expressions is a constant, as opposed to a variable equation. In such cases, Redundant Load Elimination optimization can be applied to those pairs.

If the symbolic difference of two memory operations is a constant, the second memory operation will be accessing the value from the same memory location as the first memory operation, but during a later iteration of the loop, assuming both addresses for the corresponding memory operations are directed to the same memory array and are a function of the loop induction variable. Specifically, the second memory operation will load the value from the same memory location "C" iterations of the loop after the first memory operation, wherein "C" is the constant symbolic difference between the two memory addresses. This allows the compiler to recognize the situation when redundant loads may be eliminated.

A simple example of an induction variable is the loop counter as used in loops. Consider the following loop:

```
for (i=j, i<10, i=i+3)
{ . . v[i] . . v[i+1]}
```

Here, i is an induction variable, and its symbolic expression at the beginning of the loop can be given as "$i_0+ALPHA*3$". The value "$i_0$" is the value of i at the entry point of the loop. The imaginary counter associated with the loop, "ALPHA" starts at 0 and is incremented by 1 on every loop iteration. Thus, in the above loop, the memory address referenced by v[i] is expressed by $$K_{address\text{-}of\text{-}v}+i_0+ALPHA*3,$$

where the constant $K_{address\text{-}of\text{-}v}$ is the memory address of the start of vector "v".

Therefore, the above expression defines the memory locations in memory array "v" as a function of an imaginary counter which can only be incremented by 1 in every loop iteration. In this way, the expression defines each memory location that the variable v[i] will access in the above loop.

Similarly, the memory address accessed by v[i+1] is given by $$K_{address\text{-}of\text{-}v}+i_0+ALPHA*3+1$$

The difference of the two symbolic expressions is 1, and thus, the corresponding memory addresses in these memory references will never be the same during any given iteration of the loop, and the data dependency algorithm will find these to be independent memory accesses. However, according to the present invention, this also indicates that the target of the second load in the loop will be the target of the first load in the loop on the next iteration of the loop. Therefore, the load on the next iteration is redundant and can be eliminated if the value of the first memory operation is stored in a register to be used in the next consecutive iteration.

To perform the Redundant Load Elimination optimization, the loop is changed by eliminating the redundant load operation and substituting all subsequent references to the loaded value by references to a newly created "symbolic" register. Code is added to preserve the argument of the first memory operation in the newly created symbolic register. [This code may be removed by a subsequent optimization.] Also, pre-loop code is added to initialize the symbolic register for the first loop iteration. For simple loop bound expressions and simple array indexing a load instruction is sufficient. It should be noticed that in the general case, all instructions in the dependency chain that computes the memory address for the memory operation may be replicated once in the pre-loop code.

The simplest and most common cases of Redundant Load Elimination occur between consecutive iterations of a loop. This occurs when a memory operation (load or store) is followed on the next consecutive iteration by a load from the same memory location that was targeted by the memory operation in the previous iteration. The symbolic difference between the memory addresses of these two memory operations will result in a constant of "1".

In the more complex case, the present invention recognizes redundant loads that span multiple iterations and performs Redundant Load Elimination optimization on such loops. If the symbolic difference of addresses is a constant which is divisible by the increment of the induction variable, the value of the memory address targeted by the first memory operation, either a load or store, is again accessed by the loop at some later iteration. The quotient of the constant divided by the increment is the number of increments that the value must span before being reused. Therefore, this memory operation value can be maintained in a register until recalled by the later iteration, thereby, eliminating the redundant load. As an example, consider:

```
for ( . . . , i++)
[ . . . a(i), a(i+2) . . . ]
```

Here, it is possible to save the value of a[i+2] in some register and use it two iterations later as the value of a[i]. In that case, the present invention recognizes that the value must be preserved during two iterations by generating the symbolic difference of the two memory operations (=2) and dividing by the increment of the induction variable (1).

Referring now to FIG. 1, there is depicted a flow diagram showing a method of Redundant Load Elimination in an optimizing compiler, according to the present invention. The method starts at step 10 where global scheduling or a loop optimization algorithm is being executed in the optimizing compiler. For example, the optimizing compiler may be performing loop unrolling or software pipelining at which point the present invention is utilized.

At step 20, the loop is analyzed to determine if a load follows a memory operation, such as a store or a load. If a load does follow a memory operation, and both operations were on the same array, it is further determined whether both operations are a function of the loop induction variable. This is necessary because the implementation of the present invention in the context of a loop optimization must be characteristic of every iteration of the loop in order to efficiently eliminate redundant loads. If this limitation is not imposed, some iterations of the loop may take advantage of the eliminated loads, while others may be unnecessarily burdened by the additional code and inefficient use of register space. Even more damaging, the optimization may result in an incorrectly compiled program where necessary loads have been eliminated. Therefore, if these requirements are not met, the answer to decision block 20 is "no", and the method proceeds to step 30 where the optimization algorithm is completed for this pair of memory operations.

If the decision at step 20 is affirmative, the process continues to step 40 where a symbolic expression for the address of the load operation is created. At step 50, a symbolic expression for the address of the memory operation which proceeds the load is created. At step 60, the symbolic expression for the memory operation is subtracted from the symbolic expression for the load to generate a difference.

At step 70, it is determined whether this difference is equal to a constant. If the difference is equal to a constant, the process continues through node "A" to step 80. If the difference results in a linear equation containing variables, the result of step 70 is negative and the process completes at step 30.

At step 80, it is determined whether the constant is divisible by the increment of the induction variable. If it is not, the memory addresses for these two operations will not always be the same, and therefore, Redundant Load Elimination optimization cannot be performed. In that case, the decision is negative and the process completes the optimization at step 30. If the decision is positive, Redundant Load Elimination can be performed because the result of the proceeding memory operation will be used on the next consecutive iteration, or at some later iteration of the loop. It should be noted that the present invention may also be used to optimize code that is not part of a loop, if, for example, a load follows a memory operation and they are only one-time commands. The present invention would allow the load to be eliminated if it was redundant. In that case, step 80 will not be included in the method.

With an affirmative decision at step 80, the process performs the optimization by generating code at steps 100, and 110. At step 90, pre-loop code is generated to obtain a register from the register allocator to be used by the loop for temporarily holding the data.

At step 100, code is generated within the loop to copy the value of a prior memory operation to the register so that it can be used during a later iteration. At step 110, code is generated within the loop to move the value in the register to the target of the load which is then eliminated from the source code. In substitution of steps 100 and 110, the compiled code could be generated by unrolling the loop a consecutive number of times equal to the quotient of the constant divided by the increment. In other words, the loop is unrolled the number of times the loop would have been iterated to reach the redundant load.

For an example of the above method, consider the loop from above:

```
( ..., i++)

[ ... a(i), a(i+2) ... ]
```

According to the present invention, the method must recognize that the value must be preserved during two iterations.

Initially, the method confirms that the right conditions are present to allow for the optimization. The "a(i+2)" operation is a load which follows the "a(i)" load, and they are both loads from the same array "a". Also, both operations are a function of the "i" induction variable.

The symbolic expression for the first load is $K_{address-of-a}+i_0+ALPHA*1$, and the symbolic expression for the second load is $K_{address-of-a}+i_0+ALPHA*1+2$. The difference between these two expressions is the constant "2" which is divisible by the increment of the induction variable "1". Therefore, the method of the present invention deduces that Redundant Load Elimination optimization may be performed on this pair of memory operations.

As one example of how the redundant load elimination optimization could be implemented, the loop above would be unrolled twice as follows:

```
initialize a_odd with value of a[i] for first iteration initialize a_even with value of a[i] for second iteration for( ..., i+= 2)
{
    /* unroll 1, use a_odd */
    ...
    f1(a_odd, a[i+2])
    a_odd=a[i+2]
```

```
    ...
    /* unroll 2, use a_even */
    f2(a_even, a[i+3])
    a_even=a[i+3]
    ...
}
```

This case requires code expansion or special-casing for memory access and may cause increased register pressure. Thus, it will not be best in all cases.

As another simple illustration of the Redundant Load Elimination optimization of the present invention, consider the following Livermore Loop 1 (LL1) code fragment. By recognizing, through constant difference of the symbolic expressions that one of the values loaded by iteration "i" is the same as the value loaded by iteration "i+1", it is possible to save the value in a register and eliminate one memory access from the loop.

First, the source code for LL1 to be compiled is as follows:

```
main( )
{
    register int    k;
    double x[1002], y[1002], z[1002];
    double r, t;
    register double q;
    r = 4.86;   t = 276.0;
/* loop 1    hydro excerpt */
    q = 0.1;
    for (k=1; k<=400; k++)
        x[k] = q+y[k]*(r*z[k+10]+t*z[k+11]);
}
```

As can be seen from the code, three memory loads in the inner loop are required.

During compilation, the algorithm first determines whether the Redundant Load Elimination optimization of the present invention applies. First, it is determined whether a load operation follows another memory operation such as a load. Here, there are only two memory operations in the loop which are directed to the same array, z[k+10] and z[k+11], both of which are a function of the loop induction variable k. A symbolic expression for the first load is $$K_{address-of-z}+k_0+ALPHA+10.$$

A symbolic expression for the memory address of the second memory access is given by $$K_{address-of-z}+k_0+ALPHA+11.$$

The difference between the two is "1" which is equal to the increment of the induction variable of this loop. Therefore, according to the present invention, Redundant Load Elimination optimization can be performed on this loop.

The following source code corresponds to the optimized code generated by the compiler after RLE:

```
main( )
{
    register int    k;
    double x[1002], y[1002], z[1002];
    double r, t;
    register double q;
    register double tmp;
    r = 4.86;   t = 276.0;
```

```
/* loop 1    hydro excerpt */
    q = 0.0;
    tmp=z[11];
    for (k=1; k<=400; k++){
        x[k] = q+y[k]*(r*tmp+t*(tmp=z[k+11]));
    }
}
```

Here the inner loop of the code contains only two memory loads. Thus, a redundant load has been eliminated from the code.

In conclusion, the present invention provides a simple and efficient method of recognizing when Redundant Load Elimination optimization can be used on an optimizing compiler. By utilizing information and data obtained from other compiler processes, namely the data dependency/memory disambiguation algorithm for enhanced global scheduling, the present invention enhances compiler performance by reducing processor overhead and memory consumption. Although the preferred embodiment is implemented in the global scheduling stage of compilation, the present invention could be performed in loop unrolling, or at any other stage of compilation. Symbolic expressions for the addresses of a particular pair of memory operations are generated, and one symbolic expression is subtracted from the other. If three conditions are met, Redundant Load Elimination optimization can be performed on this memory pair-the three conditions being: 1) the second memory operation is a load operation which follows the first memory operation, both memory operations being from the same memory array, 2) both operations are a function of the loop induction variable, and 3) the difference between the two symbolic addresses is equal to a constant divisible by the increment of the induction variable.

While the invention has been particularly shown and described with reference to a preferred embodiment, it will be understood by those skilled in the art that various changes in form and detail may be made therein without departing from the spirit and scope of the invention.

What is claimed is:

1. A method in a computer system for performing redundant load elimination optimization for an optimizing compiler, the method comprising the steps of:

(a) determining whether a LOAD operation follows a memory operation;

(b) testing if the LOAD operation and the memory operation are both functions of a loop induction variable and if the loop induction variable is incremented by an increment, and if so, determining if the LOAD operation and the memory operation are both a function of the same loop induction variable;

(c) creating a symbolic expression for both the LOAD operation and the memory operation, if the determination in step (a) is affirmative and the determination in step (b) is affirmative;

(d) subtracting the symbolic expression for the LOAD from the symbolic expression for the memory operation, generating a difference; and (e) indicating redundant load elimination optimization may be performed if the difference is a constant divisible by the increment of the induction variable.

2. A method according to claim 1, further comprising the step of performing redundant load elimination optimization in response to an indication that redundant load optimization may be performed.

3. A method according to claim 2, wherein the step of performing redundant load elimination optimization comprises eliminating the LOAD instruction for each increment of the loop and including an instruction in the compiled program to copy the value of the memory operation to a register, if the difference is a constant which is divisible by the increment of the induction variable.

4. A method according to claim 3, further comprising the step of initializing the register.

5. A method according to claim 3, further including an instruction to move the copied value from the register to the target of the load.

6. A method according to claim 3, further comprising the step of including an instruction to move the copied value from the register to the target of any subsequent references to the LOAD value.

7. A method according to claim 2, wherein the step of performing redundant load elimination optimization comprises including additional instructions to copy the value of the memory operation to a separate register for each iteration of the loop for a multiple number of iterations equal to the multiple, if the difference is a constant which is divisible by the increment of the induction variable, and further wherein the constant is divisible by the increment a multiple number of times.

8. A method according to claim 7, further including an instruction to move the copied value from the register to the target of the load.

9. A method according to claim 7, further comprising the step of including an instruction to move the copied value from the register to the target of any subsequent references to the LOAD value.

10. A method according to claim 2, wherein the step of performing redundant load elimination optimization comprises unrolling the loop a number of times equal to the multiple, if the difference is a constant which is divisible by the increment of the induction variable, and further wherein the constant is divisible by the increment a multiple number of times.

11. A method in a computer system for eliminating redundant loads for an optimizing compiler, wherein a LOAD and memory operation occur in an iterative loop structure having an induction variable, the method comprising the steps of:

creating a LOAD symbolic address for a LOAD operation, where the LOAD operation follows a memory operation;

creating a memory operation symbolic address for the memory operation which precedes the LOAD;

subtracting the LOAD symbolic address from the memory operation symbolic address to generate a difference;

eliminating the LOAD instruction for each increment of the loop and including an instruction to copy the value of the memory operation to a register, if the difference is a constant which is divisible by the increment of the induction variable.

12. A method according to claim 11, further comprising the step of initializing the register.

13. A method according to claim 11, further comprising the step of including additional instructions in the iterative loop structure to copy the value of the memory operation to a separate register for each iteration during a number of iterations equal to a quotient of the constant divided by the multiple of the increment of the induction variable, if the difference is a constant which is divisible by a multiple of the increment of the induction variable, wherein the multiple is greater than one.

14. A method according to claim 11, further including an instruction to move the copied value from the register to the target of the load.

15. A method according to claim 11, further comprising the step of including an instruction to move the copied value from the register to the target of any subsequent references to the LOAD value.

16. A method according to claim 11, further comprising the step of unrolling the loop a number of times equal to a quotient of the constant divided by the multiple of the increment of the induction variable, if the difference is a constant which is divisible by the increment of the induction variable, and further wherein the constant is divisible by the increment to produce a quotient a multiple number of times.

17. A method in a computer system for performing redundant load elimination optimization for an optimizing compiler, the method comprising the steps of:

(a) determining whether a LOAD operation follows a memory operation;

(b) testing if the LOAD operation and the memory operation are both functions of a loop induction variable and if the loop induction variable is incremented by an increment, and if so, determining if the LOAD operation and the memory operation are both a function of the same loop induction variable;

(c) creating a symbolic expression for both the LOAD operation and the memory operation if the determination in step (a) is affirmative and the determination in step (b) is affirmative;

(d) subtracting the symbolic expression for the LOAD from the symbolic expression for the memory operation, generating a difference;

(e) performing redundant load elimination optimization, if the difference is a constant, by eliminating the LOAD instruction for each increment of the loop and including an instruction in the compiled program to copy the value of the memory operation to a register.

18. A method according to claim 17, further comprising the step of initializing the register.

19. A method according to claim 17, further including an instruction to move the copied value from the register to the target of the load.

20. A method according to claim 17, further comprising the step of including an instruction to move the copied value from the register to the target of any subsequent references to the LOAD value.

21. A method according to claim 17, wherein the step of performing redundant load elimination optimization comprises including additional instructions to copy the value of the memory operation to a separate register for each iteration of the loop for a multiple number of iterations equal to a quotient of the constant divided by the multiple of the increment of the induction variable, if the difference is a constant which is divisible by the increment of the induction variable, and further wherein the constant is divisible by the increment a multiple number of times.

22. A method according to claim 21, further including an instruction to move the copied value from the register to the target of the load.

23. A method according to claim 21, further comprising the step of including an instruction to move the copied value from the register to the target of any subsequent references to the LOAD value.

24. A method according to claim 17, wherein the step of performing redundant load elimination optimization comprises unrolling the loop a number of times equal to a quotient of the constant divided by the multiple of the increment of the induction variable, if the difference is a constant which is divisible by the increment of the induction variable, and further wherein the constant is divisible by the increment a multiple number of times.

* * * * *

UNITED STATES PATENT AND TRADEMARK OFFICE
CERTIFICATE OF CORRECTION

PATENT NO. : 5,537,620
DATED : July 16, 1996
INVENTOR(S) : Breternitz

It is certified that error appears in the above-indentified patent and that said Letters Patent is hereby corrected as shown below:

Column 3, line 56: insert --$*OP_3+k_4$-- before "$*OP_4$"

Column 7, line 15: insert --90,-- before "100"

Signed and Sealed this

Tenth Day of December, 1996

Attest:

BRUCE LEHMAN

*Attesting Officer*  *Commissioner of Patents and Trademarks*